US012620879B2

(12) United States Patent
Hikima et al.

(10) Patent No.: US 12,620,879 B2
(45) Date of Patent: May 5, 2026

(54) COIL INSERTION DEVICE

(71) Applicant: HONDA MOTOR CO., LTD., Tokyo (JP)

(72) Inventors: Norihiko Hikima, Tokyo (JP); Yasuto Ohashi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 664 days.

(21) Appl. No.: 18/050,472

(22) Filed: Oct. 28, 2022

(65) Prior Publication Data

US 2023/0155462 A1     May 18, 2023

(30) Foreign Application Priority Data

Nov. 17, 2021     (JP) ................................. 2021-187290

(51) Int. Cl.
H02K 15/066     (2025.01)
H02K 15/065     (2025.01)
H02K 15/22     (2025.01)
*H02K 15/24*     (2025.01)

(52) U.S. Cl.
CPC ......... H02K 15/066 (2013.01); H02K 15/065 (2013.01); H02K 15/22 (2025.01); *H02K 15/24* (2025.01); *Y10T 29/53143* (2015.01)

(58) Field of Classification Search
CPC ...... H02K 15/065; H02K 15/22; H02K 15/24; H02K 15/066; Y10T 29/53143
See application file for complete search history.

(56) References Cited

U.S. PATENT DOCUMENTS

| 10,581,304 | B2 * | 3/2020 | Muto | ...................... H02K 15/22 |
| 2017/0373570 | A1 * | 12/2017 | Muto | ...................... H02K 15/24 |
| 2018/0367014 | A1 | 12/2018 | Hashimoto et al. | |

FOREIGN PATENT DOCUMENTS

| JP | 2000116078 | A | 4/2000 |
| JP | 2016127693 | A | 7/2016 |
| JP | 6390772 | B2 | 9/2018 |
| JP | 2019024278 | A * | 2/2019 |

(Continued)

OTHER PUBLICATIONS

Petrell et al, "Manufacturing of Conically Shaped Concentrated Windings for Wheel Hub Engines by a Multi-Stage Upsetting Process," 2019 9th International Electric Drives Production Conference (EDPC), Esslingen, Germany, 2019, pp. 1-7. (Year: 2019).*

(Continued)

*Primary Examiner* — A. Dexter Tugbang
(74) *Attorney, Agent, or Firm* — CKC & Partners Co., LLC

(57)     ABSTRACT
A coil insertion device includes coil diameter expanders, the coil diameter expanders being configured to insert a coil assembly in a wound state into slots of a stator core by expanding the coil assembly in diameter from inside of the stator core, each of the coil diameter expanders includes: a coil presser that is arranged inside the coil assembly and presses coil end portions of the coil assembly outward from inside to expand the coil end portions in diameter; and a restrictor that is arranged outside the coil assembly, restricts outward movement of the coil end portions expanded in diameter by the coil presser, and sandwiches the coil end portions of the coil assembly inserted in the slots with the coil presser.

3 Claims, 15 Drawing Sheets

(56)               References Cited

FOREIGN PATENT DOCUMENTS

| | | | |
|---|---|---|---|
| JP | 2019126195 | A | 7/2019 |
| JP | 2020137195 | A | 8/2020 |

OTHER PUBLICATIONS

Decision of Refusal issued in the JP Patent Application No. 2021-187290, mailed on Aug. 22, 2023.

Notification of Reasons for Refusal issued in the JP Patent Application No. 2021-187290, mailed on Jun. 6, 2023.

Office Action issued Oct. 15, 2025 in the CN Patent Application No. 202211377380.1.

* cited by examiner

COIL INSERTION DEVICE

This application is based on and claims the benefit of priority from Japanese Patent Application No. 2021-137290, filed on 17 Nov. 2021, the content of which is incorporated herein by reference.

BACKGROUND OF THE INVENTION

Field of the Invention

The present invention relates to a coil insertion device and a coil insertion method.

Related Art

There has been conventionally known a method of mounting a coil into slots of a stator core by inserting the coil wound in an annular shape inside the stator core and pressing the coil outward from the inside against the slots of the stator core by a roller arranged eccentrically inside the coil to expand the coil in diameter (for example, see Japanese Patent No. 6390772).

Patent Document 1: Japanese Patent No. 6390772

SUMMARY OF THE INVENTION

FIG. 16 shows a state in which one coil 300 of a coil assembly mounted in stator core 400 expands in diameter by being pressed outward from inside, and inserted into slots 401 from inside of the stator core 400. By coil end portions 301 being pressed, the coil 300 moves outward from inside of the stator core 400 while expanding in diameter. Along therewith, pitch P between straight portions 302 of the coil 300 inserted into slots 401 is widened, and the coil end portions 301 also spread in the circumferential direction of the stator core 400.

However, when insertion of the coil 300 into the slots 401 is completed, and the pressure is released, a phenomenon occurs that the coil end portions 301 expanded in diameter decrease in diameter, trying to return to the state before the diameter expansion, due to springback of the coil 300 as shown in FIG. 17. When the coil end portions 301 are reduced in diameter to the state before the diameter expansion, the pitch P between straight portions 302 changes in a direction of being reduced, and there is a possibility that the coil 300 inserted in the slots 401 moves inward in the radial direction and returns to the inside of the stator core 400. To address this, it is necessary to, for example, repeatedly press the coil 300, which causes a disadvantage that the workability of coil insertion work is poor.

An object of the present invention is to provide a coil insertion device and a coil insertion method capable of preventing a coil from returning inward due to springback of coil end portions after insertion into slots and improving the workability of coil insertion work.

A first aspect of the present invention is directed to a coil insertion device (for example, a coil insertion device 1 described later) including coil diameter expanders (for example, the coil diameter expansion devices 5 described later), the coil diameter expanders being configured to insert a coil assembly (for example, a strip-shaped coil 100 described later) in a wound state into slots (for example, slots 22 described later) of a stator core (for example, a stator core 2 described later) by expanding the coil assembly in diameter from inside of the stator core. Each of the coil diameter expanders includes: a coil presser (for example, a coil presser 53 described later) that is arranged inside the coil assembly and presses coil end portions (for example, coil end portions 103 described later) of the coil assembly outward from inside to expand the coil end portions in diameter; and a restrictor (for example, a restrictor 55 described later) that is arranged outside the coil assembly, restricts outward movement of the coil end portions expanded in diameter by the coil presser, and sandwiches the coil end portions of the coil assembly inserted in the slots with the coil presser.

A second aspect is an embodiment of the first aspect. In the coil insertion device according to the second aspect, the restrictor has an inner peripheral surface (for example, an inner peripheral surface 55a described later) that may be perpendicular to an end face (for example, an end face 2a described later) of the stator core.

A third aspect is an embodiment, of the first aspect. In the coil insertion device according to the third aspect, the restrictor has an inner peripheral surface (for example, an inner peripheral surface 55a) as an inclined surface that may be inclined outward in a radial direction with an increase in distance from an end face (for example, an end face 2a described later) of the stator core.

A fourth aspect of the present invention is directed to a coil insertion method for inserting a coil assembly (for example, the strip-shaped coil 100 described later) in a wound state into slots (for example, the slots 22 described later) of a stator core (for example, the stator core 2 described later) by expanding the coil assembly in diameter from inside of the stator core. The method includes: pressing coil end portions (for example, the coil end portions 103 described later) of the coil assembly outward from inside to expand the coil end portions in diameter by a coil presser (for example, the coil presser 53 described later) arranged inside the coil assembly, thereby inserting the coil assembly into the slots; and restricting, by a restrictor (for example, the restrictor 55 described later) arranged outside the coil assembly, outward movement of the coil end portions expanded in diameter by the coil presser, and sandwiching the coil end portions of the coil assembly inserted in the slots between the coil presser and the restrictor.

According to the above (1), by sandwiching the coil end portions of the coil assembly inserted in the slots between the coil presser and the restrictor, it is possible to offset springback that occurs on the coil end portions. Therefore, it is possible to prevent the coil from returning inward due to springback of the coil end portions after the coil is inserted into the slots and improve the workability of coil insertion work. By the coil end portions being sandwiched between the coil presser and the restrictor, gaps among the coils laminated in the slots 22 are also eliminated.

According to the above (2), it is possible to apply pressing force equally to the coil end portions and lay out the coil end portions on the end face of the stator core in good order.

According to (3) above, since it is possible to cause the coil end portions to be inclined outward in the radial direction, it is possible to control the height of protrusion of the coil end portions and easily secure space on the inner diameter side of the coil end portions.

According to the above (4), by sandwiching the coil end portions of the coil assembly inserted in the slots between the coil presser and the restrictor, it is possible to offset springback that occurs on the coil end portions. Therefore, it is possible to prevent the coil from returning inward due to springback of the coil end portions after the coil is inserted into the slots and improve the workability of coil insertion work. By the coil end portions being sandwiched between the coil presser and the restrictor, gaps among the coils laminated in the slots are also eliminated.

BRIEF DESCRIPTION OF THE DRAWINGS

FIG. 4 is a front view showing an embodiment of a coil assembly;

FIG. 6 is a plan view showing the coil assembly and a restrictor in the stator core;

DETAILED DESCRIPTION OF THE INVENTION

Figure 1:
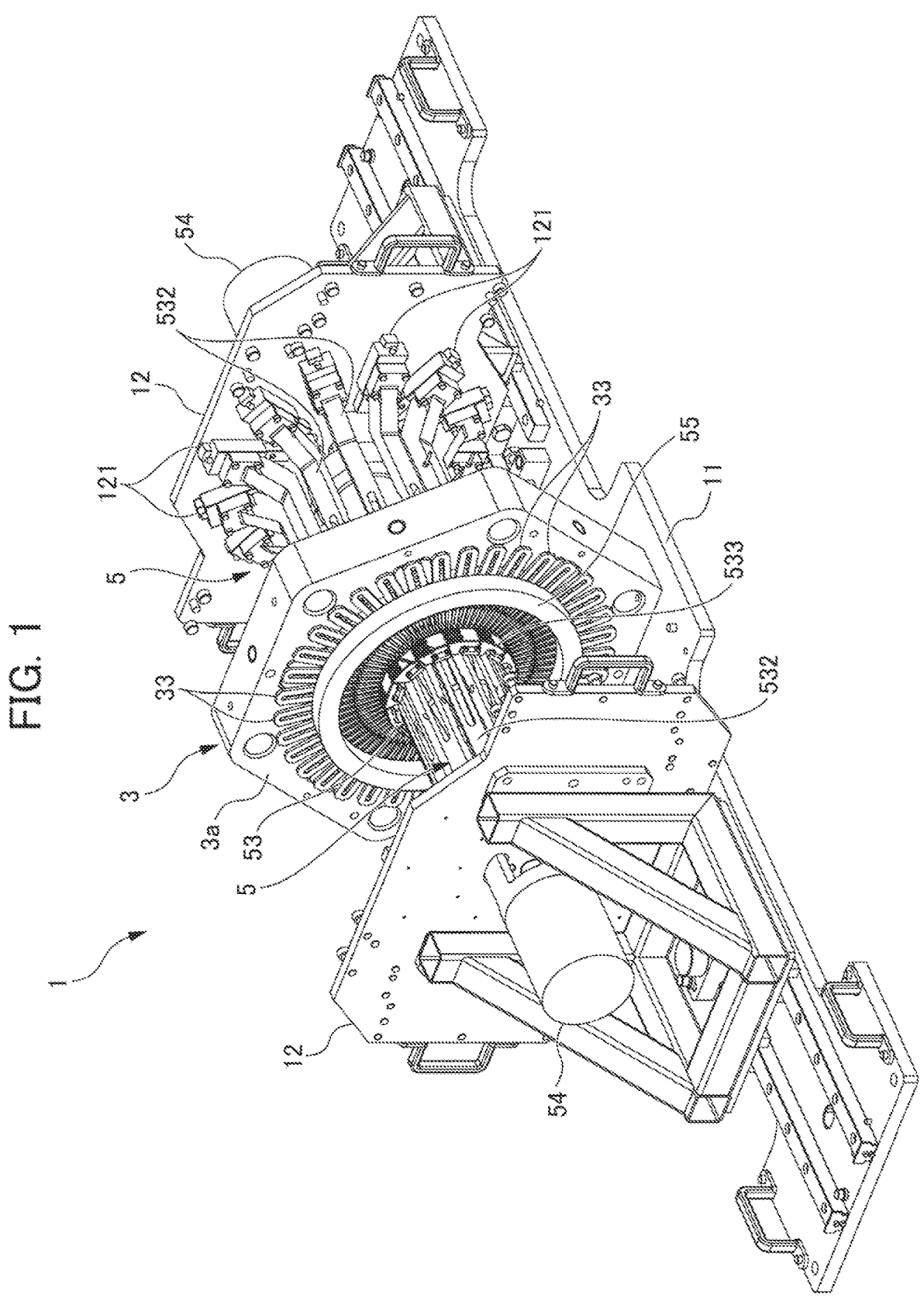
FIG. 1 is a perspective view showing a coil insertion device according to an embodiment of the present invention.
Figure 2:
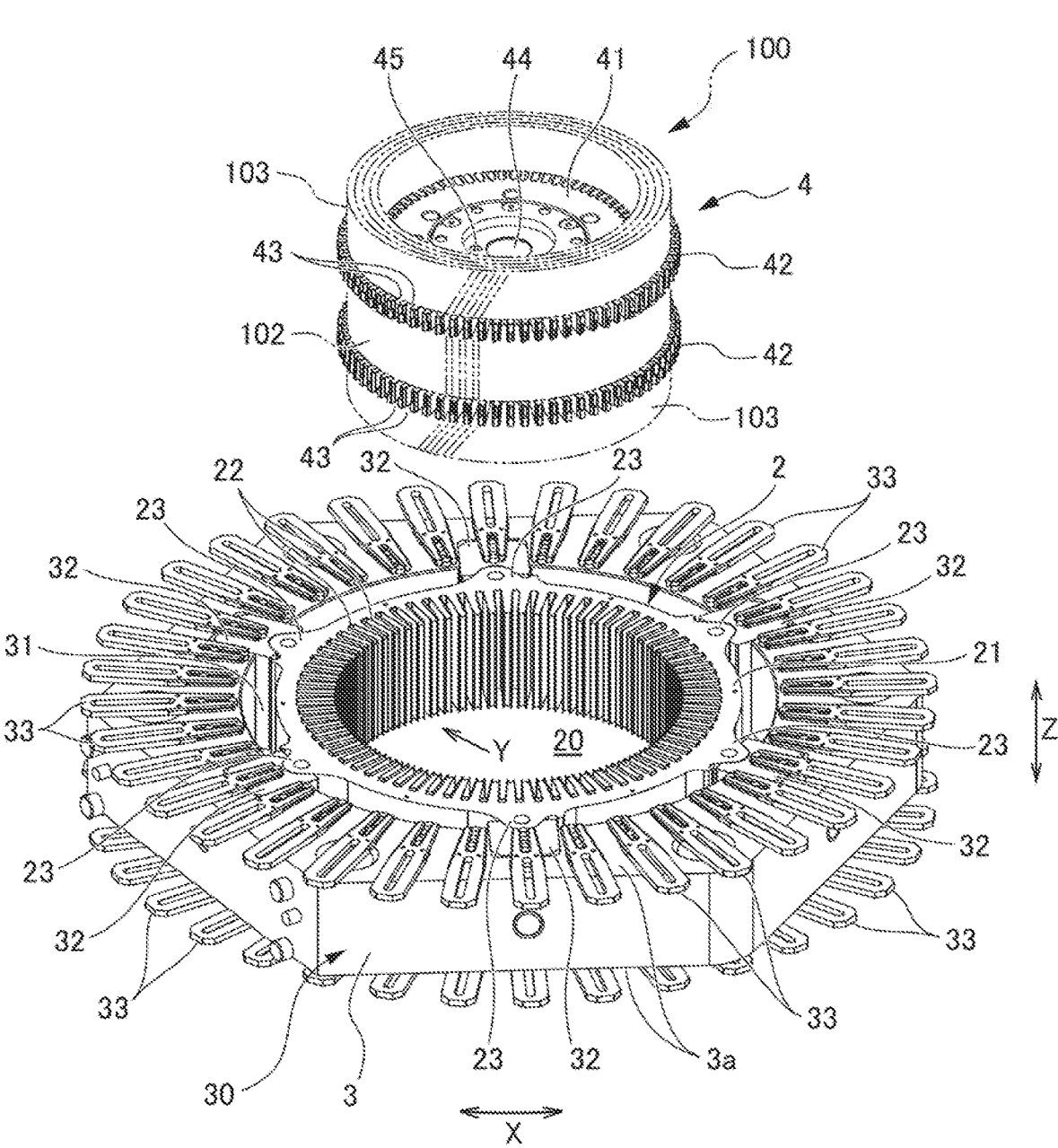
FIG. 2 is a perspective view showing a stator core fixing jig to which a stator core is fixed and a coil winding jig, in the coil insertion device, the stator core fixing jig and the coil winding jig being disassembled.

Hereinafter, an embodiment of the present invention will be described in detail with reference to the drawings. As shown in FIGS. 1 and 2, a coil insertion device 1 includes a stator core 2, a stator core fixing jig 3 for fixing the stator core 2, a coil winding jig 4 that is insertable inside the stator core 2 and has a strip-shaped coil 100 wound therearound in an annular shape, and coil diameter expansion devices 5 that cause the strip-shaped coil 100 wound around the coil winding jig 4 to move and expand in diameter.

Figure 3:
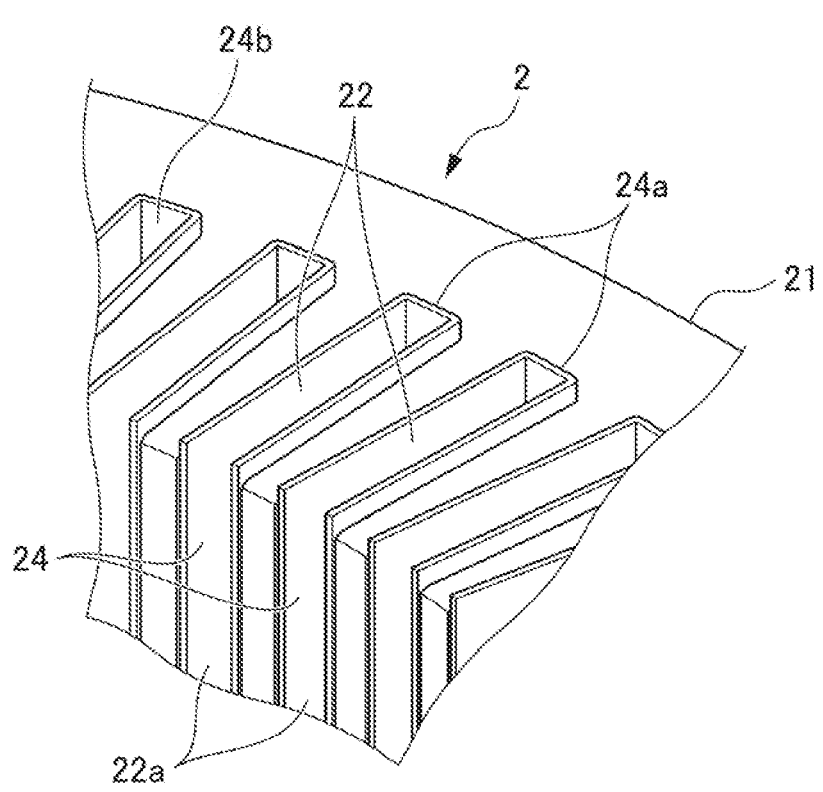
FIG. 3 is a perspective view showing pieces of insulating paper mounted in slots of the stator core.

As shown in FIGS. 2 and 3, the stator core 2 includes an annular portion 21 consisting of, for example, a laminate in which a plurality of thin core plates are laminated. The annular portion 21 has a through-hole 20 penetrating therethrough in an axial direction at the center thereof. The stator core 2 has a plurality of slots 22 penetrating therethrough in the axial direction of the stator core 2. The slots 22 are arranged radially at regular intervals along the circumferential direction of the annular portion 21, and have opening portions 22a that are open to the through-hole 20. The stator core 2 of the present embodiment has seventy-two slots 22. On the outer circumference of the annular portion 21 of the stator core 2, there are six tab portions 23 protruding at regular intervals.

In the stator core 2, an X direction in which the slots 22 are arranged is the circumferential direction as shown in FIG. 2. A Y direction along a direction radial from the center of the through-hole 20 is the radial direction. A Z direction is the axial direction.

As shown in FIG. 2, the stator core fixing jig 3 has a hexagonal cylinder shape having a dimension in the axial direction which is substantially equal to the dimension in the axial direction of the stator core 2, and has, at the center thereof, a stator core insertion hole 31 in which the stator core 2 can be inserted and arranged. In the coil insertion device 1 of the present embodiment, the stator core fixing jig 3 is fixed to a center portion of a base 11 of the coil insertion device 1 such that the axial direction of the stator core 2 fixed in the stator core insertion hole 31 is a horizontal direction.

The stator core fixing jig 3 fixes the stator core 2 in the stator core insertion hole 31 at a predetermined position and in a predetermined posture. Specifically, as shown in FIG. 2, the stator core fixing jig 3 has six core holding blocks 32 that, can move to protrude into and retract from the inside of the stator core insertion hole 31, corresponding to positions of the six tab portions 23 of the stator core 2. After the stator core 2 is inserted into the stator core insertion hole 31, the stator core fixing jig 3 causes each of the core holding blocks 32 to protrude into the stator core insertion hole 31 by driving of an actuator such as a cylinder (not shown). As a result, as shown in FIG. 2, the core holding blocks 32 grip the tab portions 23 of the stator core 2, respectively, to fix the stator core 2 in the stator core insertion hole 31 at the predetermined position and in the predetermined posture.

As shown in FIG. 3, pieces of insulating paper 24 are mounted in the slots 22 of the stator core 2, respectively, in advance. Each piece of insulating paper 24 is formed by being folded in a substantially U-shape so as to follow the substantially U-shaped inner surface of the slot 22 when the stator core 2 is viewed in the axial direction. As shown in FIG. 3, the pieces of insulating paper 24 mounted in the slots 22 have cuff portions 24a protruding from the slots 22 in the axial direction of the stator core 2 at a predetermined height. The cuff portions 24a protrude from the slots 22 to both outer sides of the stator core 2 in the axial direction.

As shown in FIG. 2, on both end faces 3a of the stator core fixing jig 3 in the axial direction, to which the stator core 2 is fixed, a plurality of cuff guides 33 are attached such that the cuff guides 33 are radially arranged at regular intervals along the circumferential direction. Each of the cuff guides 33 is provided being movable along the radial direction of the stator core 2 by driving of the actuator such as a cylinder (not shown). Each cuff guide 33 is formed in an elongated thin-plate shape along the radial direction of the stator core 2. Each of the cuff guides 33 is open to the inside of the stator core fixing jig 3 and, by sandwiching the cuff portion 24a of a corresponding piece of insulating paper 24 from both sides, supports the piece of insulating paper 24 in the slot 22 at the time of inserting the strip-shaped coil 100.

As shown in FIG. 2, the coil winding jig 4 includes a substantially cylindrical jig main body 41, a plurality of comb tooth portions 42 radially protruding from the outer periphery of the jig main body 41, and a plurality of comb-tooth-shaped grooves 43 each of which is formed between comb tooth portions 42 adjacent to each other in the circumferential direction, and a shaft hole 44 opened in the center of the jig main body 41. The comb tooth portions 42 and the comb-tooth-shaped grooves 43 are provided on both end portions in the axial direction of the jig main body 41. The phases of the comb tooth portions 42 and the comb-tooth-shaped grooves 43 on both end portions of the jig main body 41 are aligned in the axial direction. The number of comb-tooth-shaped grooves 43 arranged in the circumferential direction of the jig main body 41 matches the number of slots 22 provided in the stator core 2. Therefore, the coil winding jig 4 of the present embodiment has seventy-two comb-tooth-shaped grooves 43. In order that the coil winding jig 4 can be inserted inside the annular portion 21 of the stator core 2, the coil winding jig 4 is formed so that the outer diameter of the coil winding jig 4 defined by the positions of the tips of the comb tooth portions 42 is smaller than the inner diameter of the stator core 2.

Figure 4:
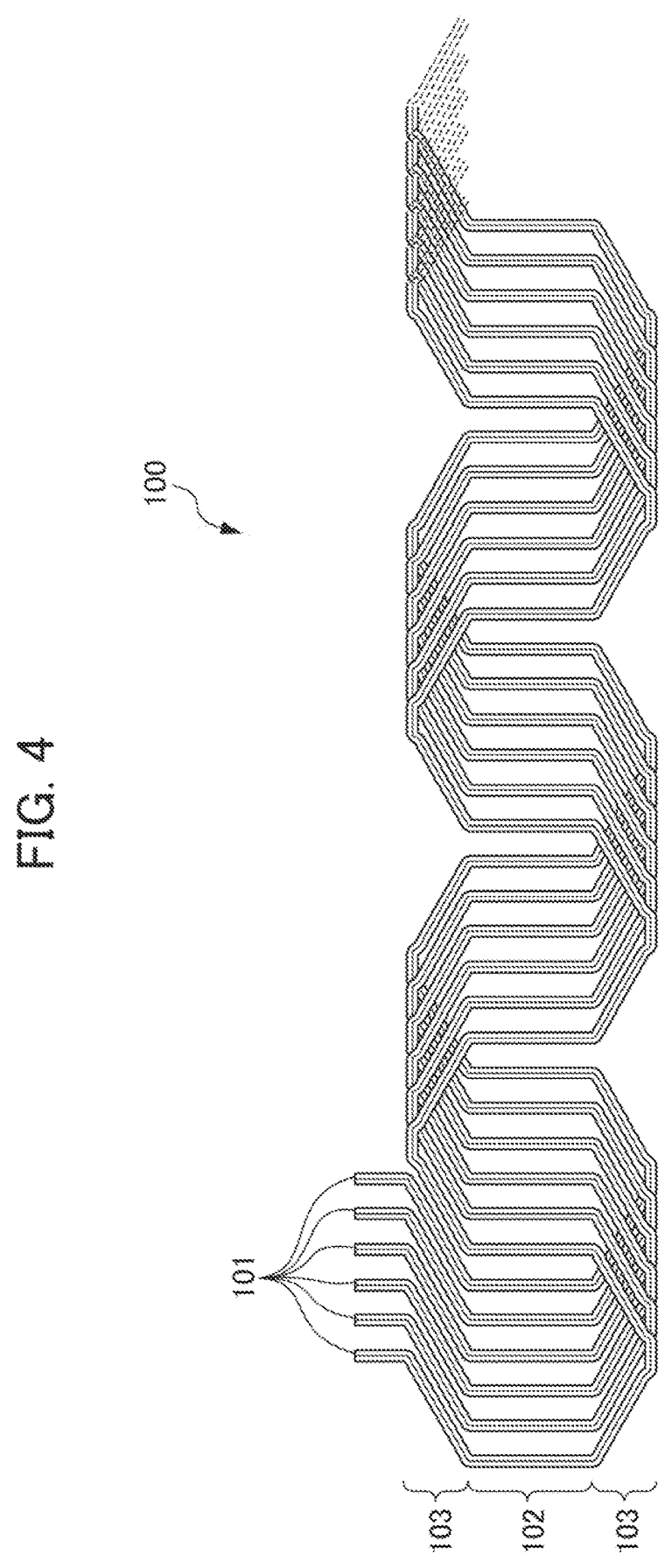

The strip-shaped coil 100 is wound around the coil winding jig 4 in an annular shape. As shown in FIG. 4, the strip-shaped coil 100 is a coil assembly configured with an elongated strip-shaped continuous wave-wound coil formed by flat type conducting wires 101 made of copper, aluminum or the like each of which has a substantially rectangular section. As the coil assembly, a plurality of segment coils formed in a substantially U-shape can be used, in addition to the wave-wound coil. However, at the time of setting a coil into slots of a stator core, the continuous wave-wound coil does not require a common dominant technique for forming a plurality of coil segments and welding ends of the coil segments after insertion into the slots, thereby eliminating, for example, the need to use a high-purity copper material for the coil in order to cope with thermal processing of welded portions. Therefore, it becomes possible to use recycled copper material that includes impurities, and it is possible to contribute to realization of reuse of resources. Moreover, since the wave-wound coil does not require welding, weight reduction of the coil is possible, and it is possible to reduce the weight of a rotary electric machine using the coil. When the rotary electric machine is mounted on a hybrid car, it is possible to, by the vehicle weight being reduced, reduce carbon dioxide and reduce the harmful effect on the global environment.

The strip-shaped coil 100 has a plurality of straight portions 102 and a plurality of coil end portions 103. The straight portions 102 are parts to be inserted into the slots 22 of the stator core 2, and they extend substantially linearly and are arranged in parallel at regular intervals. The coil end portions 103 are arranged at positions nearer to the side ends of the strip-shaped coil 100 than the straight portions 102, and alternately connect end portions on one side of adjacent straight portions 102 and end portions on the other side of adjacent straight portions 102 in chevron shapes. The coil end portions 103 are parts which are arranged so as to protrude from the slots 22 in the axial direction of the stator core 2 when the strip-shaped coil 100 is mounted in the slots 22 of the stator core 2. The strip-shaped coil 100 of the present embodiment is formed in an elongated strip-shape by bundling six flat type conducting wires 101 with the plurality of straight portions 102 and the plurality of coil end portions 103 that are formed by folding, such that the straight portions 102 are arranged side by side in parallel at regular intervals.

The coil winding jig 4 winds the strip-shaped coil 100 in many layers by successively inserting the straight portions 102 of the strip-shaped coil 100 into the comb-tooth-shaped grooves 43 before being inserted inside the stator core 2. As a result, as shown in FIG. 2, the coil winding jig 4 around which the strip-shaped coil 100 is wound in an annular shape is configured.

The coil winding jig 4 around which the strip-shaped coil 100 is wound in an annular shape is held in a predetermined posture at a predetermined position in the stator core insertion hole 31 by the coil diameter expansion devices 5 arranged on both sides of the stator core fixing jig 3 with the stator core fixing jig 3 being sandwiched therebetween. The coil diameter expansion device 5 of the present embodiment constitutes a coil diameter expander. As shown in FIG. 1, the coil diameter expansion devices 5 face the coil winding jig 4 inserted inside the stator core 2 in the axial direction.

Figure 5:
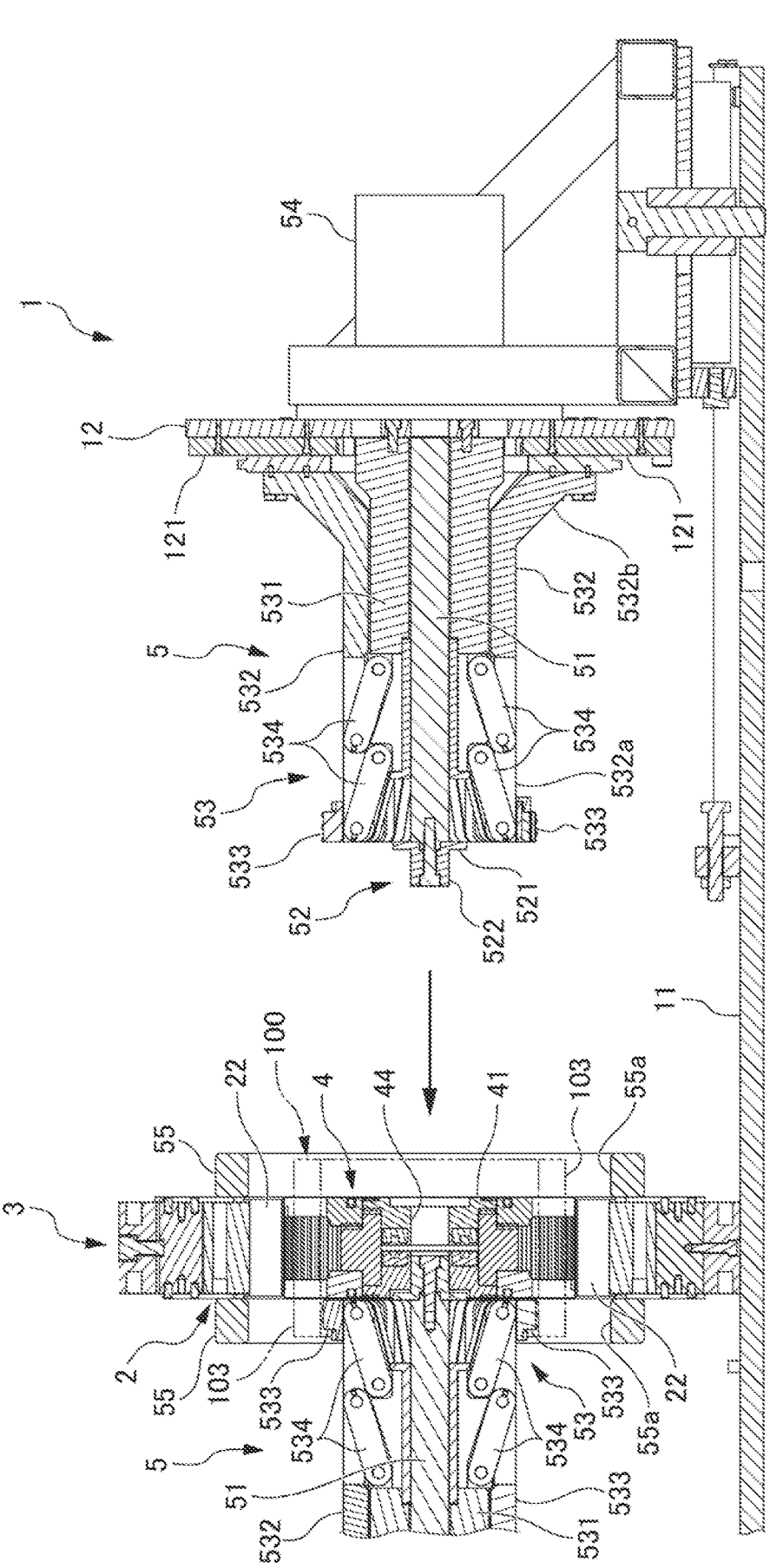
FIG. 5 is a sectional view of the coil insertion device showing a state in which a coil diameter expansion device is being mounted to the coil assembly.

As shown in FIGS. 1 and 5, the coil insertion device 1 is provided with a pair of support boards 12 which are erected on the base 11 fixing the stator core fixing jig 3 in a manner of facing each other, sandwiching the stator core fixing jig 3 therebetween. The coil diameter expansion devices 5 protrude in a horizontal direction from the support boards 12, respectively, toward the coil winding jig 4 inserted inside the stator core 2. Each of the coil insertion devices 5 is provided to be movable in directions of coining into contact with and being separated from the coil winding jig 4 by the support board 12 linearly moving on the base 11 by driving of a motor or the like not shown.

Figure 7:
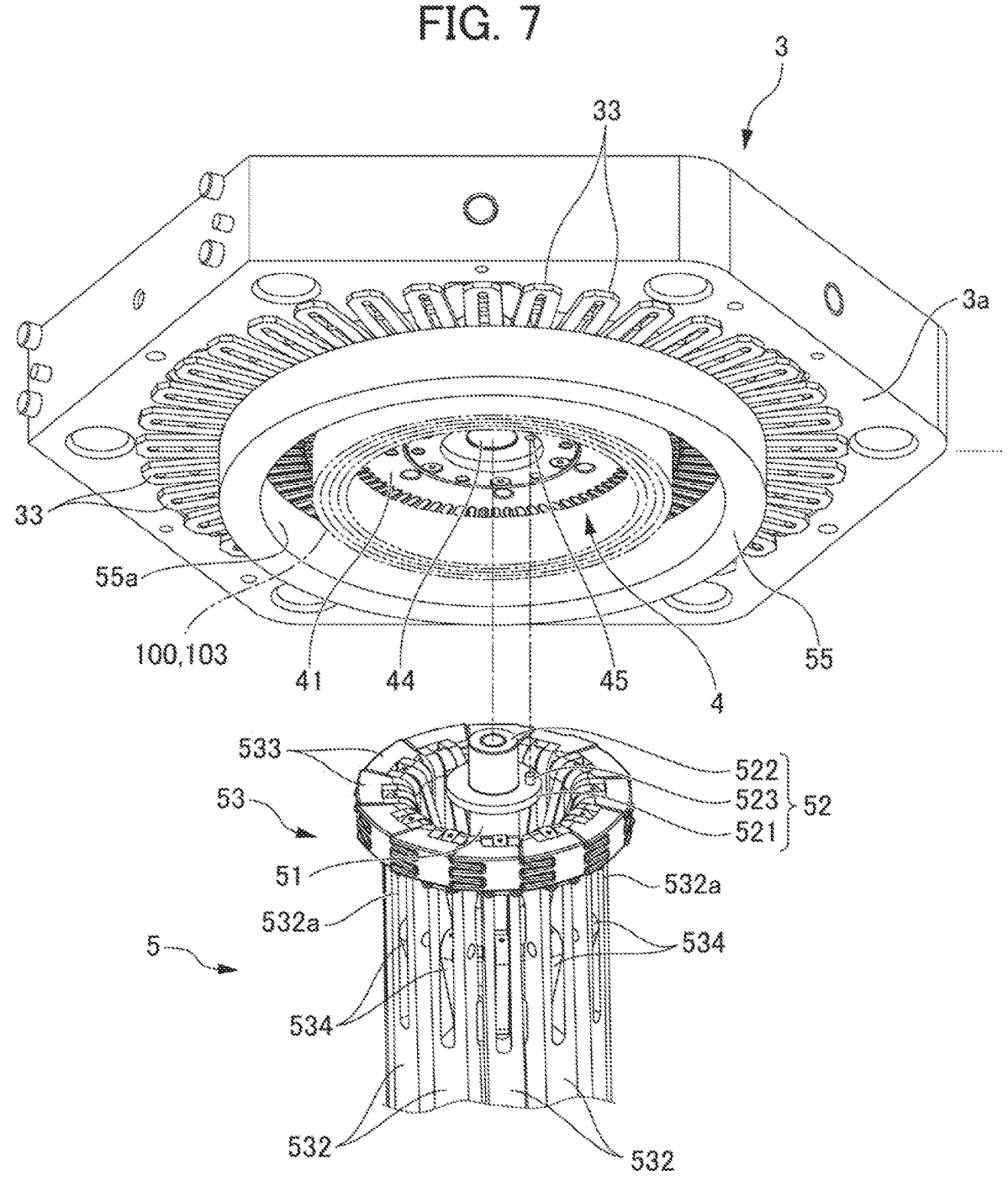
FIG. 7 is a perspective view showing a state in which the coil diameter expansion device is being inserted inside a coil.

As shown in FIGS. 5 and 7, each coil diameter expansion device 5 has, in the center thereof, a main shaft portion 51 extending from the support board 12 toward the coil winding jig 4 inserted inside the stator core 2. At the tip of the main shaft portion 51, a holder 52 for holding the coil winding jig 4 at a predetermined position and in a predetermined posture inside the stator core 2 is provided. The holder 52 has a shaft protruding portion 522 protruding from the center of a circular end plate portion 521 arranged at the tip of the main shaft portion 51, and a positioning protruding portion 523 protruding in the same direction as the shaft protruding portion 522 from the end plate portion 521 on the outside in the radial direction of the shaft protruding portion 522. The shaft protruding portion 522 fits into the shaft hole 44 of the coil winding jig 4. The positioning protruding portion 523 fits into one positioning hole 45 provided on the outside of the shaft hole 44 in the radial direction of the coil winding jig 4.

Figure 6:
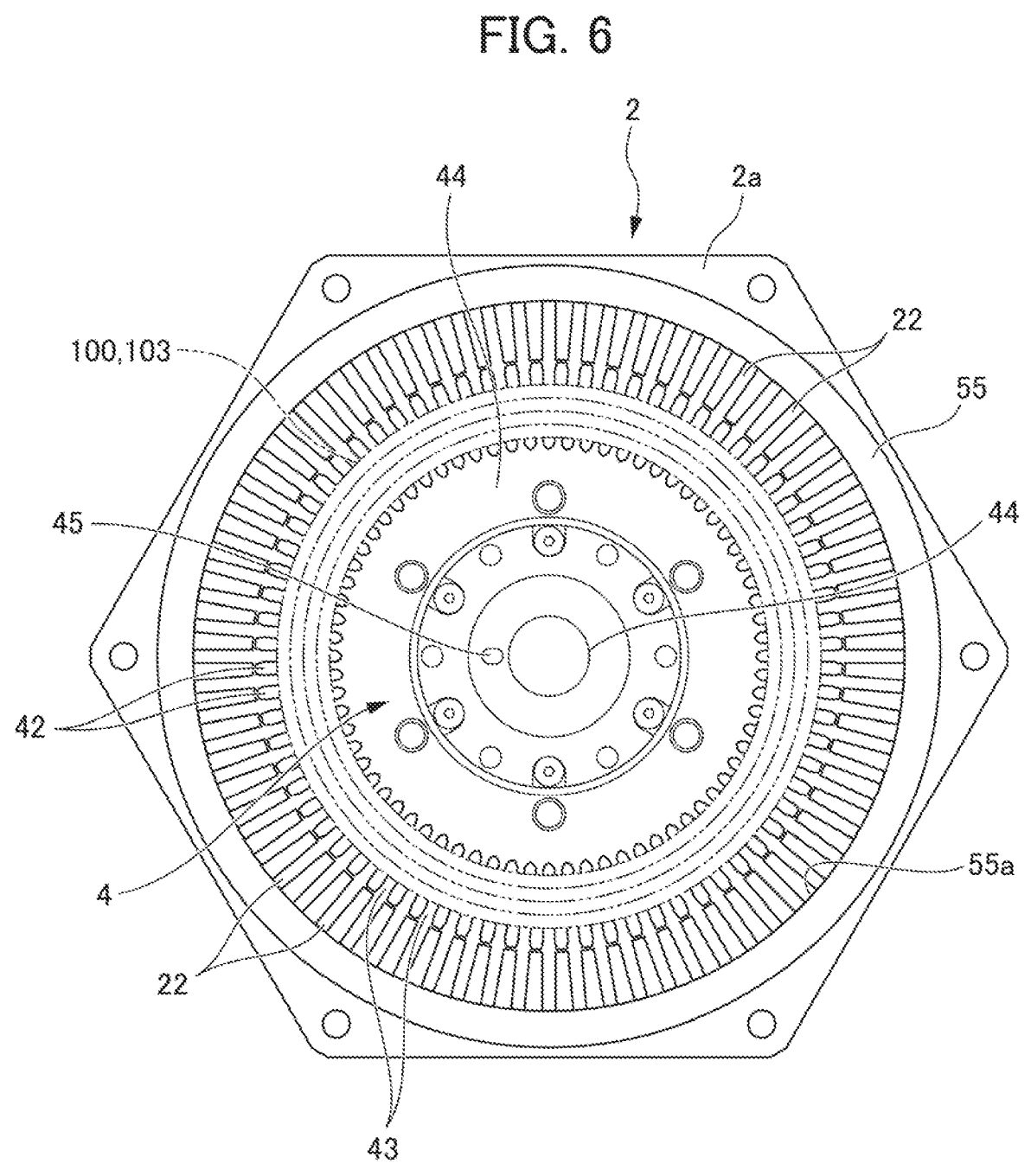

The positioning hole 45 of the coil winding jig 4 and the positioning protruding portion 523 of the holder 52 are provided, being positioned in advance so that the phase of the slots 22 of the stator core 2 fixed to the stator core fixing jig 3 and the phase of the comb-tooth-shaped grooves 43 of the coil winding jig 4 inserted inside the stator core 2 match each other when the positioning hole 45 and the positioning protruding portion 523 are fitted to each other. Therefore, when the coil diameter expansion device 5 moves to the stator core fixing jig 3, and the shaft protruding portion 522 and the positioning protruding portion 523 of the holder 52 are fitted into the shaft hole 44 and the positioning hole 45 of the coil winding jig 4, respectively, the coil winding jig 4 is held in a state where the comb-tooth-shaped grooves 43 are in phase with the slots 22 of the stator core 2, as shown in FIG. 6. As a result, the insides of the slots 22 of the stator core 2 communicate with the insides of the comb-tooth-shaped grooves 43 of the coil winding jig 4, respectively, in the radial direction.

The coil diameter expansion device 5 has a coil presser 53 on the outer peripheral side of the main shaft portion 51. The coil presser 53 includes a movable cylinder portion 531 that fits to the outer peripheral side of the main shaft portion 51, a plurality of movable arm portions 532 arranged on the further outer peripheral side of the movable cylinder portion 531, and a plurality of piece members 533 provided at the tips of the movable arm portions 532, respectively.

The movable cylinder portion 531 has a length shorter than the length of the main shaft portion 51, and is provided to be slidable along the axial direction of the main shaft portion 51 by driving of an actuator 54 such as a cylinder arranged behind the support board 12.

The plurality of movable arm portions 532 extend along the axial direction of the main shaft portion 51, and are arranged on the outer peripheral side of the movable cylinder portion 531 at regular intervals in the circumferential direction. The coil presser 53 of the present embodiment has twelve movable arm portions 532 arranged along the circumferential direction of the main shaft portion 51. Twelve guide rails 121 radially arranged outward in the radial direction with the main shaft portion 51 as the center are provided on the surface of the support board 12. Rear ends 532b of the movable arm portions 532 are attached so as to be movable along the guide rails 121. The movable arm portions 532 bend from the guide rails along the axial direction of the movable cylinder portion 531 and extend to the vicinity of the outer periphery of the holder 52. Tips 532a of the movable arm portions 532 are connected to the outer peripheral surface on the tip side of the movable cylinder portion 531 via every two link portions 534 which are rotatably attached.

As shown in FIGS. 8 to 11, the piece members 533, each of which has a substantially fan shape, are provided at the tips of the movable arm portions 532, respectively. Therefore, the coil presser 53 of the present embodiment has the twelve piece members 533 arranged in an annular shape. Each of the piece members 533 has a pair of fitting protrusions 533a at one end portion in the circumferential direction of the coil presser 53 (in the circumferential direction of the plurality of annular piece members 533) and has a pair of fitting grooves 533b to be fitted to an adjacent pair of fitting protrusions 533a at the other end portion in the circumferential direction. The paired fitting protrusions 533a are arranged in parallel in the axial direction of the coil presser 53, and protrude in parallel in the circumferential direction, being continuous with the outer peripheral surface 530 of the coil presser 53. The twelve piece members 533 are annularly arranged on the outer peripheral side of the holder 52 by the pair of fitting protrusions 533a and the pair of fitting grooves 533b of piece members 533 adjacent to each other in the circumferential direction being fitted to each other. The circumferential direction of the coil presser 53 is a C direction shown in FIGS. 8 to 11.

Figure 8:
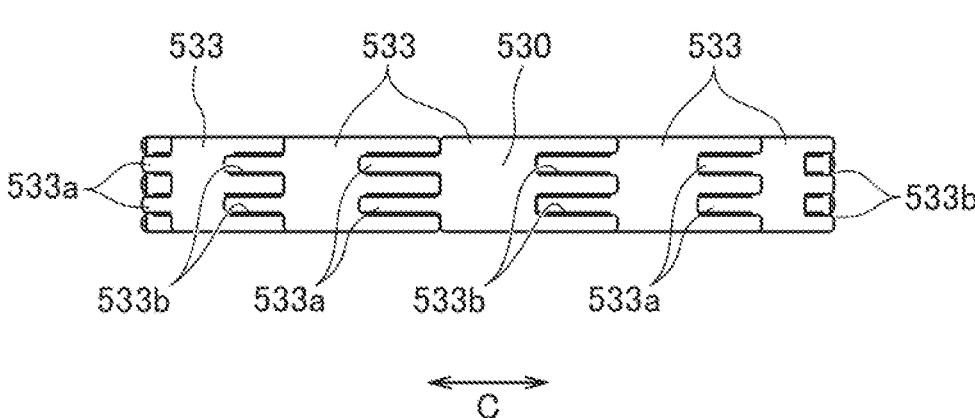
FIG. 8 is a side view showing a presser oi: the coil diameter expansion device in a diameter reduced state.
Figure 9:
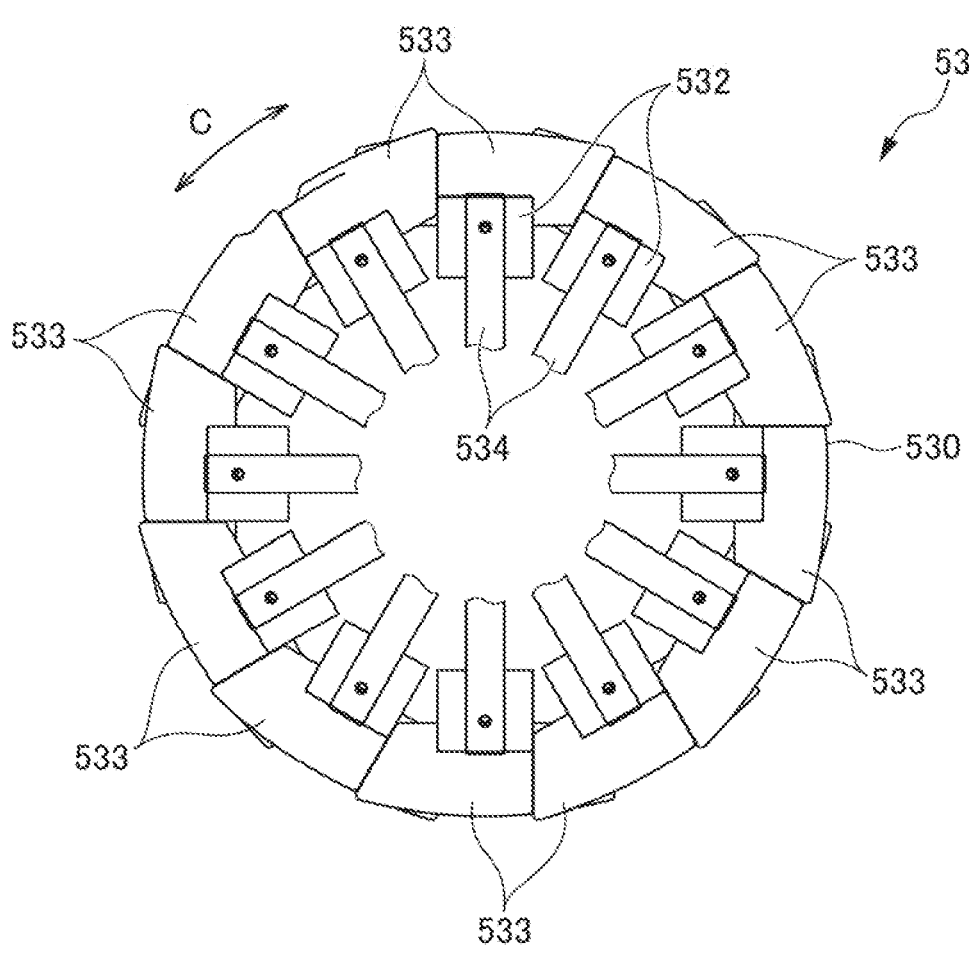
FIG. 9 is a front view showing the presser of the coil diameter expansion device in the diameter reduced state.

FIG. 5 shows a state in which the movable cylinder portion 531 is retracted to the rear end side (the support board 12 side) of the main shaft portion 51. At this time, the movable arm portions 532 move to the inner end sides of the radial guide rails 121, and are arranged so as to be closest to the outer, peripheral surface of the movable cylinder portion 531. As a result, as shown in FIGS. 8 and 9, the coil presser 53 is into a state of being most reduced in diameter, causing the twelve piece members 533 to be in close contact with one another. The outer diameter of the coil presser 53 when the piece members 533 have been reduced in diameter is smaller than the inner diameter of the coil end portions 103 cylindrically protruding in the axial direction from the coil winding jig 4 around which the strip-shaped coil 100 is wound. The coil diameter expansion device 5 is inserted into the coil end portions 103 cylindrically protruding in the axial direction of the coil winding jig 4 while the plurality of piece members 533 of the coil presser 53 are reduced in diameter, and the coil winding jig 4 is held by the holder 52.

Figures 10, 11:
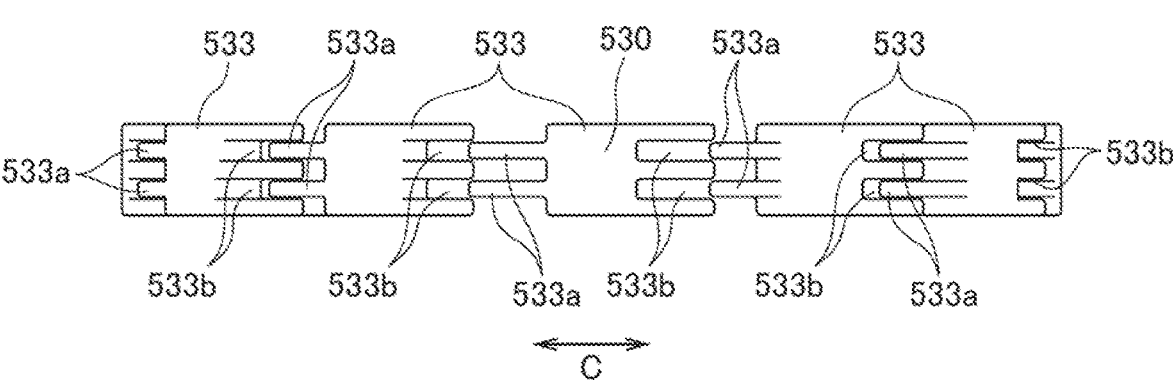
FIG. 10 is a side view showing the presser of the coil diameter expansion device in a diameter expanded state.
FIG. 11 is a side view showing the presser of the coil diameter expansion device in the diameter expanded state.

When the movable cylinder portion 531 advances to the coil winding jig 4 along the main shaft portion 51 by driving of the actuator 54, the link portions 534 connected to the movable cylinder portion 531 are turned so as to protrude outward in the radial direction of the movable cylinder portion 531, thereby translating the movable arm portions 532 outward along the guide rails. As a result, the twelve movable arm portions 532 are separated from the movable cylinder portion 531 outward in the radial direction. At this time, as shown in FIGS. 10 and 11, the coil presser 53 causes adjacent piece members 533 to move to be separated from each other and is into a state of most, expanded in diameter. The outer diameter of the coil presser 53 expanded in diameter is larger than the outer diameter of the coil winding jig 4. By the coil presser 53 expanding in diameter, the coil, end portions 103 are moved outward from inside.

As shown in FIGS. 9 and 11, when the coil presser 53 is most expanded in diameter, adjacent piece members 533 separate from each other, but a pair of fitting protrusions 533a protrude in the circumferential direction between the piece members 533. The fitting protrusions 533a have not completely come out of the fitting grooves 533b of the adjacent piece member 533, maintaining fitting in the fitting grooves 533b. Therefore, the plurality of piece members 533 in an annular shape expanded in diameter have a closed outer peripheral surface 530 that is continuous in the circumferential direction. Therefore, when the coil presser 53 is viewed in the circumferential direction, adjacent piece members 533 are continuous with each other by a pair of fitting protrusions 533a, and such a groove portion (a gap) that penetrates the coil presser 53 in the radial direction is not formed.

The coil diameter expansion device 5 further has a restrictor 55 as shown in FIGS. 1, and 5 to 7. Though the restrictor 55 of the present embodiment is formed in a cylindrical shape, the restrictor 55 may be formed in a plate shape having a circular opening in the center. The restrictor 5b may be divided in a plurality of parts in the circumferential direction. In this case, the restrictor 55 may be provided so as to be movable in the radial direction relative to the stator core 2. The restrictor 55 is omitted in FIG. 2. In FIG. 6, the stator core fixing gig 3 is omitted.

The restrictor 55 is arranged concentrically with the stator core 2 outside the coil end portions 103 of the strip-shaped coil 100. Specifically, on both end faces 2a of the stator core 2 in the axial direction, the restrictors 55 are arranged concentrically with the strip-shaped coil 100 in a wound state of being wound around the coil winding jig 4 so as to surround the whole periphery of the outside of the annular strip-shaped coil 100 as shown in FIGS. 5 and 6. In the present embodiment, an inner peripheral surface 55a of the restrictor 55 is arranged on slightly outside the position of the slots 22 of the stator core 2 on the outer diameter side.

The restrictor 55 of the present embodiment is attached to each of the end faces 2a of the stator core 2 after the stator core 2 is attached to the stator core fixing jig 3 so as to sandwich the plurality of cuff guides 33 with the end face 2a for example, by a mounting mechanism not shown. Further, the restrictor 55 may be concentrically arranged on the outer circumference of the coil presser 53 of the coil diameter expansion device 5 and configured to, when the coil presser 53 is inserted inside the strip-shaped coil 100, be simultaneously arranged outside the strip-shaped coil 100, though it is not shown.

The restrictor 55 is arranged outside the slots 22 of the stator core 2 and, as described later, sandwiches the coil end portions 103 with the piece members 533 of the coil presser 53 when the strip-shaped coil 100 is inserted into the slots 22 by the coil presser 53 expanding in diameter. The inner peripheral surface 55a of the restrictor 55 of the present embodiment forms a surface perpendicular to the end face 2a of the stator core 2. The inner peripheral surface 55a is a surface perpendicular to a moving direction of the strip-shaped coil 100 and a surface parallel to an axial direction Z of the stator core 2.

Next, a method for inserting the strip-shaped coil 100 wound around the coil winding jig 4 into the slots 22 from the inside of the stator core 2 fixed to the stator core fixing jig 3, in the coil insertion device 1 will be described with reference to FIGS. 12A to 12D, and FIG. 13. FIGS. 12A to 12D show only one end face 2a side of the stator core 2.

First, the coil winding jig 4 around which the strip-shaped coil 100 is annularly wound is inserted into the inside of the stator core 2 fixed to the stator core fixing jig 3. After that, the cuff guides 33 move inward in the radial direction by driving of the actuator not shown, and sandwich and support the cuff portions 24a of the pieces of insulating paper 24 in the slots 22. As a result, the pieces of insulating paper 24 are positioned at predetermined positions in the slots 22, respectively.

As shown in FIGS. 5 and 7, by the pair of coil diameter expansion devices 5 moving to the coil winding jig 4, the coil winding jig 4 inserted inside the stator core 2 is sandwiched and held by the holders 52 of the coil diameter expansion devices 5. At this time, the piece members 533 of the coil presser 53 are in a state of being reduced in diameter more than the inner diameter of the annular strip-shaped coil 100 as shown in FIGS. 3 and 9, and are inserted inside the coil end portions 103 of the strip-shaped coil 100.

Figure 12A:
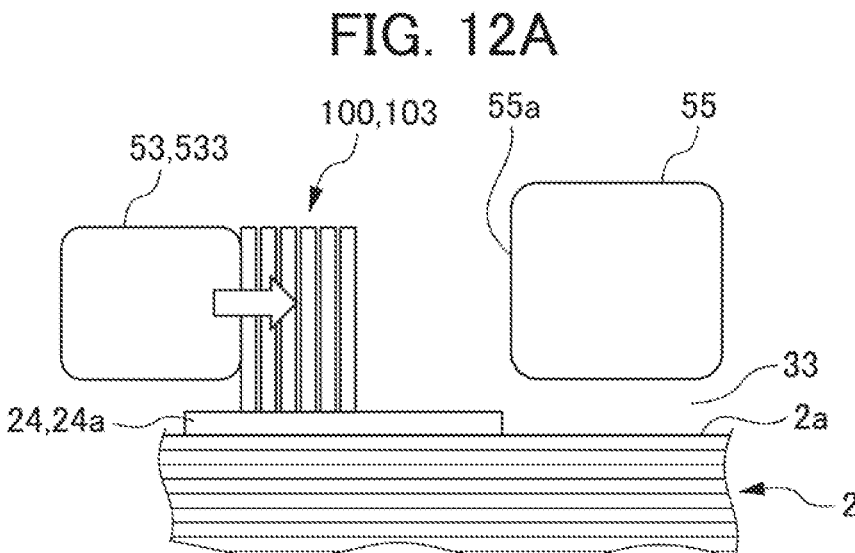
FIG. 12A is a diagram illustrating a state in which the coil is being pressed by the presser and inserted into the slots.

After that, the piece members 533 of the coil presser 53 move in a manner of expanding in diameter from the diameter-reduced state by driving of the actuator 54 as shown in FIGS. 10 and 11. As a result, the coil end portions 103 of the strip-shaped coil 100 wound around the coil winding jig 4 are pressed outward from the inside by the piece members 533 of the coil presser 53. The whole periphery of the strip-shaped coil 100 pressed by the coil presser 53 gradually expands. Along therewith, the straight portions 102 move to the slots 22 of the stator core 2 which communicate with the comb-tooth-shaped grooves 43, being guided by the comb-tooth-shaped grooves 43 of the coil winding jig 4. The straight portions 102 of the strip-shaped coil 100 are inserted into the slots 22 of the stator core 2 from the opening portions 22a of the slots 22 without interfering with the slots 22 (FIG. 12A).

Figure 12B:
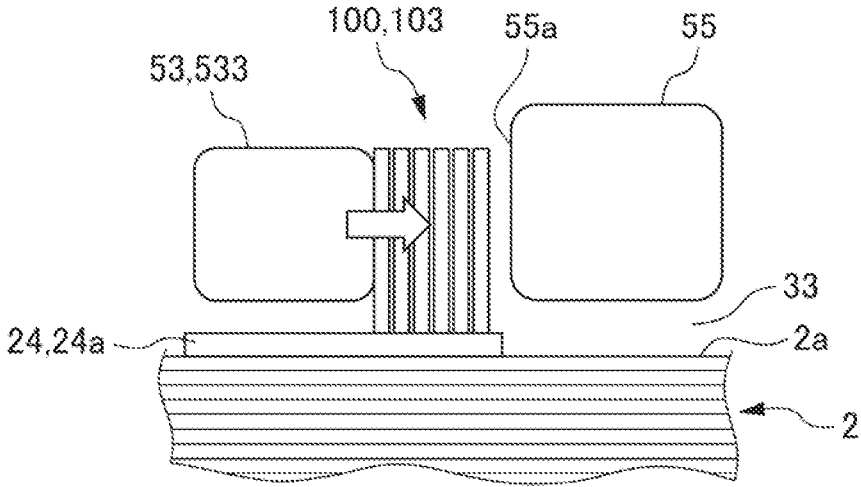
FIG. 12B is a diagram illustrating a state in which the coil is being pressed against the restrictor by the presser.

When the coil presser 53 further expands, the coil end portions 103 of the strip-shaped coil 100 are pressed by the piece members 533 of the coil presser 53 and come into contact with end portions of the slots 22 on the outer diameter side. Since the inner peripheral surface 55a of the restrictor 55 is arranged slightly outside the positions of the slots 22 on the outer diameter side, the coil end portions 103 and the inner peripheral surface 55a of the restrictor 55 are slightly separated from each other (FIG. 12B).

Figure 12C:
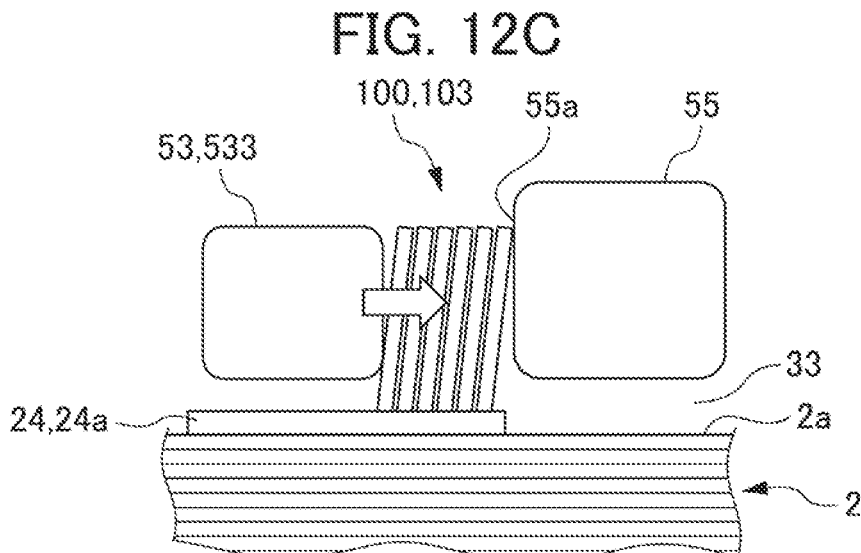
FIG. 12C is a diagram illustrating the state in which the coil is being pressed against the restrictor by the presser.

When the coil end portions 103 are further pressed after coming into contact with the end portions of the slots 22 on the outer diameter side, the coil end portions 103 come into contact with the inner peripheral surface 55a of the restrictor 55 while being transformed to be tilted outward in the radial direction (FIG. 12C).

Figure 12D:
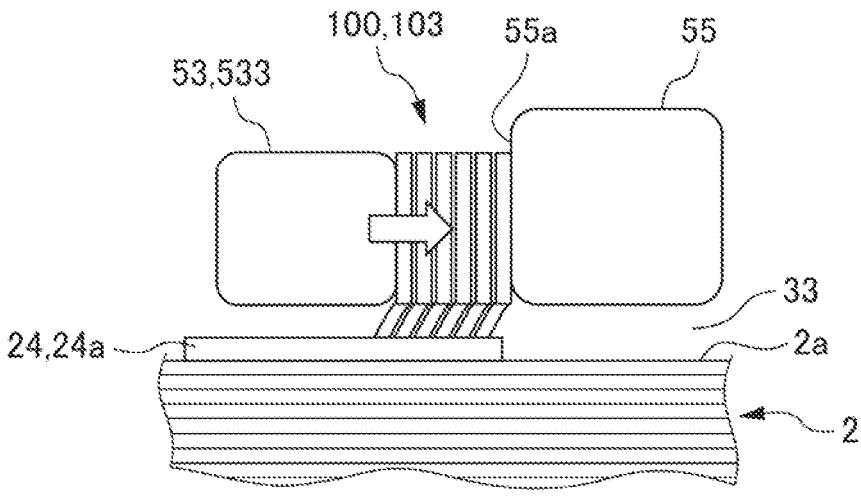
FIG. 12D is a diagram illustrating the state in which the coil is being pressed against the restrictor by the presser.

After that, the coil end portions 103 are pressed against the inner peripheral surface of the restrictor 55 by pressing force of the piece members 533 of the coil presser 53 expanding in diameter. As a result, the coil end portions 103 are sandwiched between the piece members 533 and the restrictor 55 (FIG. 12D).

Figure 13:
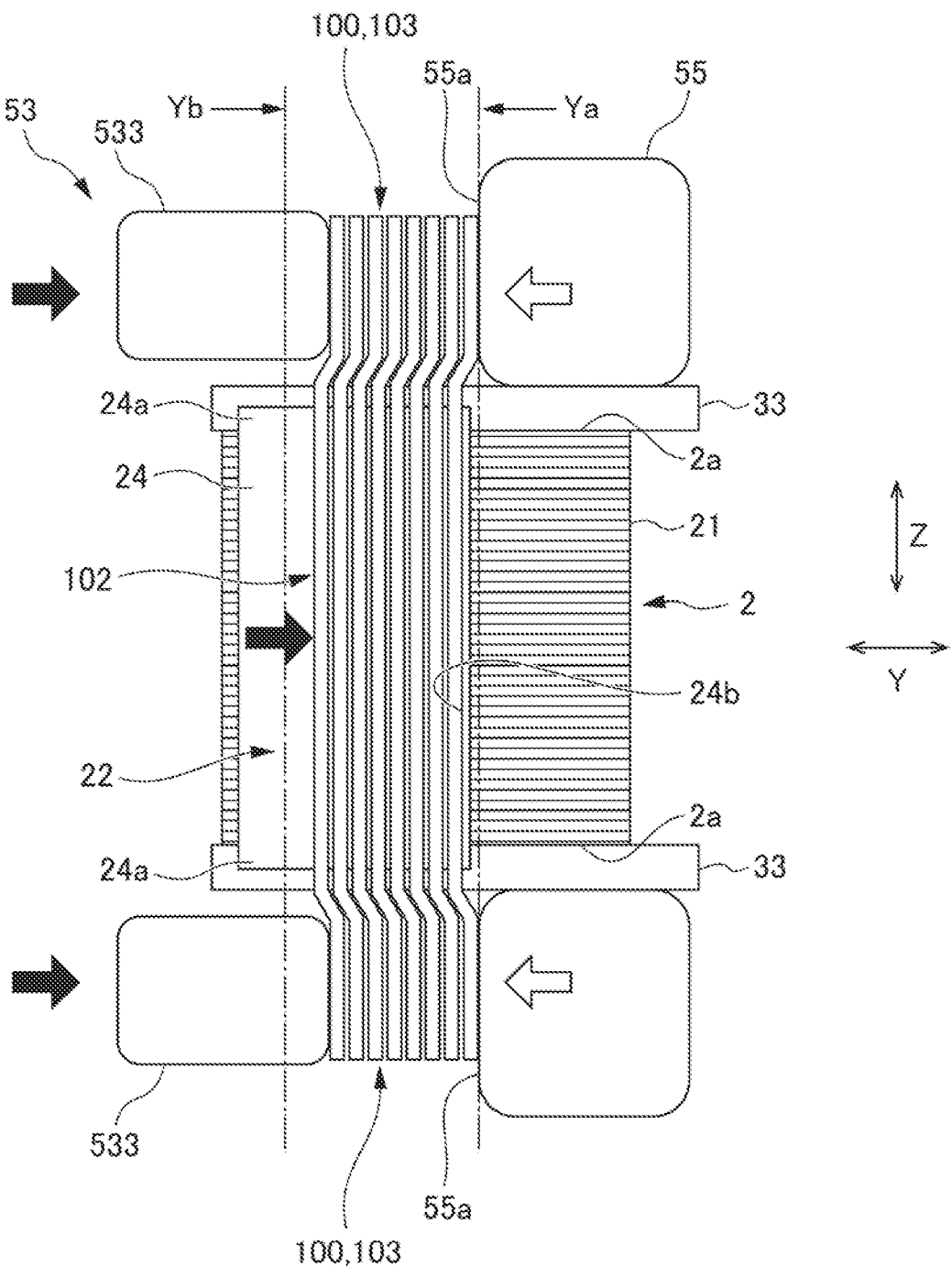
FIG. 13 is a sectional view showing a state in which the coil inserted into the slots is sandwiched between the presser and the restrictor.

When the coil end portions 103 are sandwiched between the piece members 533 and the restrictor 55, as shown in FIG. 13, the position of the outer diameter side of the coil end portions 103 is restricted to an outer diameter restriction position Ya defined by the inner peripheral surface 55a of the restrictor 55. Since the restrictor 55 is arranged in position outside the slots 22, the coil end portions 103 are compressed against the inner peripheral surface 55a of the restrictor 55 on the outside in the radial direction by being sandwiched between the outer peripheral surface 530 of the piece members 533 of the coil presser 53 and the inner peripheral surface 55a of the restrictor 55. The position of the compressed coil end portions 103 on the inner diameter side moves outside an inner diameter reference position Yb before the compression in the radial direction.

By the coil end portions 103 being compressed between the piece members 533 of the coil presser 53 expanding in diameter and the restrictor 55 for a predetermined time, stress over plastic deformation is applied to the coil end portions 103. As a result, the direction of residual stress that occurs on the coil end portions 103 by diameter expansion changes, and springback is offset. As a result, the strip-shaped coil 100 inserted in the slots 22 is prevented from returning inward due to spring back. Further, since outward movement of the coil end portions 103 is restricted by the restrictor 55, occurrence of looseness of the strip-shaped coil 100 on the front side in the movement direction is prevented, and gaps among the straight portions 102 laminated in the slots 22 are eliminated. Furthermore, since the straight portions 102 are prevented from excessively hitting a back portion 24b of the pieces of insulating paper 24 in the slots 22, the pieces of insulating paper 24 are prevented from being crushed.

Figure 14:
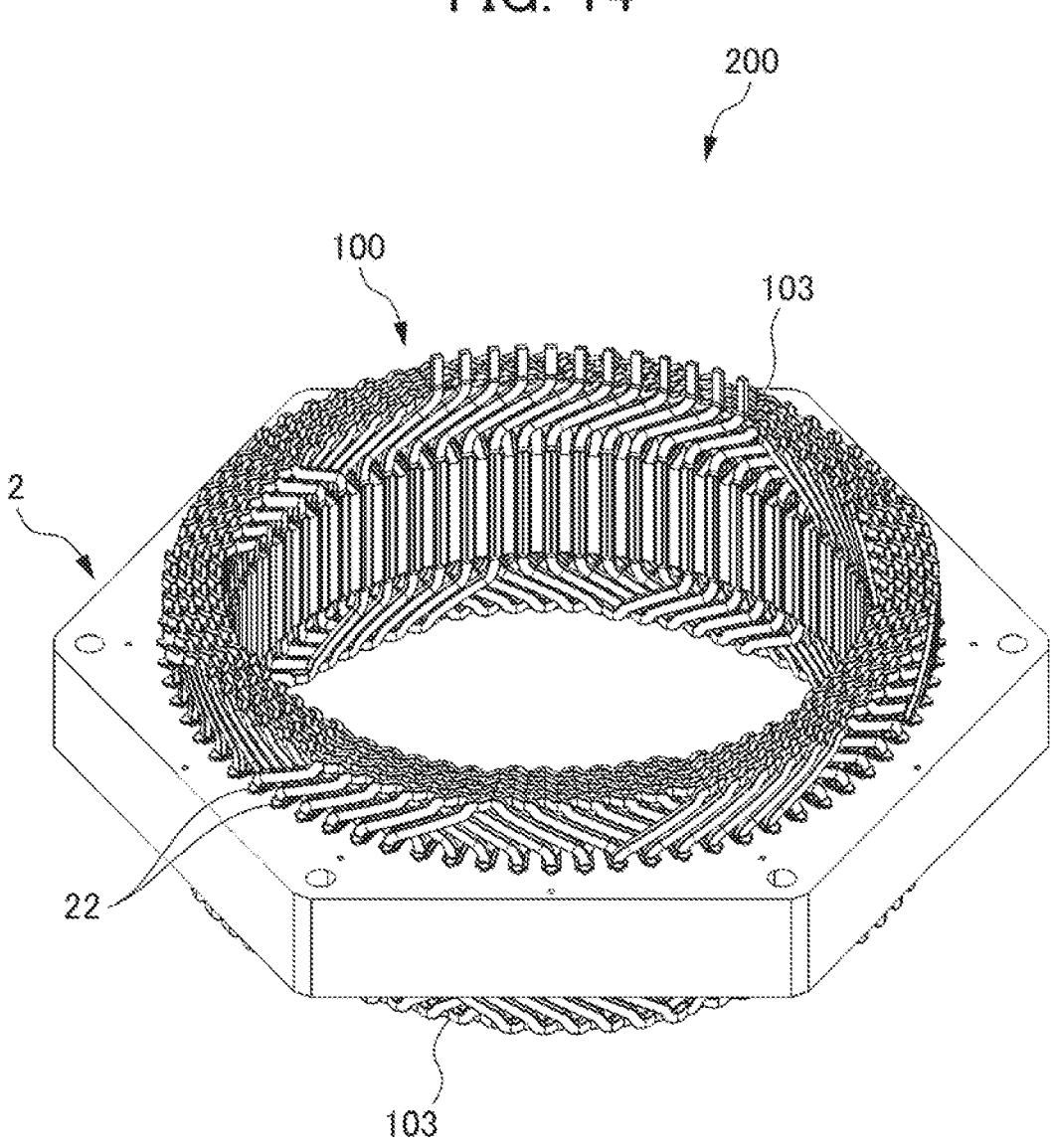
FIG. 14 is a perspective view showing a stator.

As a result, a stator 200 in which the strip-shaped coil 100 is prevented from returning is obtained as shown in FIG. 14.

Since the inner peripheral surface 55a of the restrictor 55 is a surface perpendicular to the end face 2a of the stator core 2. It is possible to apply pressing force equally to the coil end portions 103 and lay out the coil end portions 103 on the end face 2a of the stator core 2 in good order. However, the inner peripheral surface 55a of the restrictor 55 is not limited to a perpendicular surface. The inner peripheral surface 55a may be an inclined surface that is inclined outward in the radial direction with an increase in distance from the end face 2a of the stator core 2 in the axial direction.

Figure 15A:
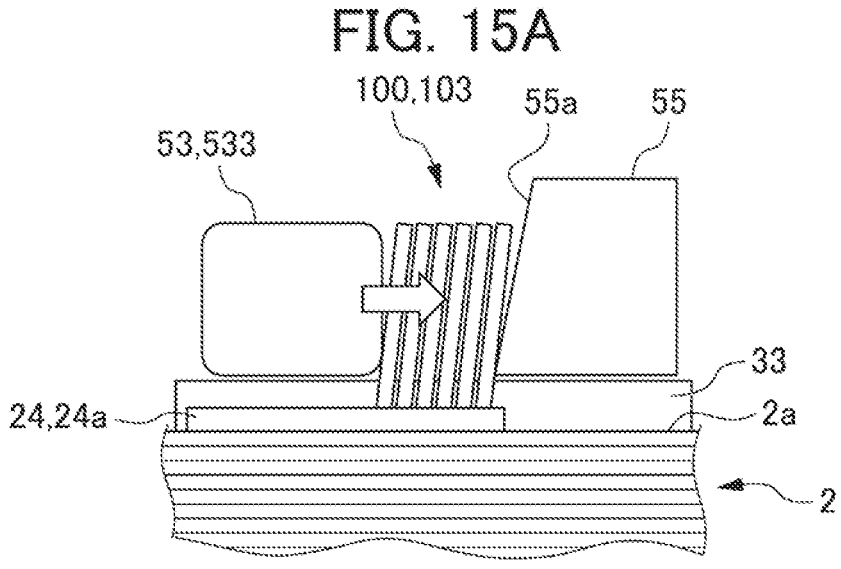
FIG. 15A is a diagram illustrating a state in which the coil is being pressed against the restrictor by the presser.
Figure 15B:
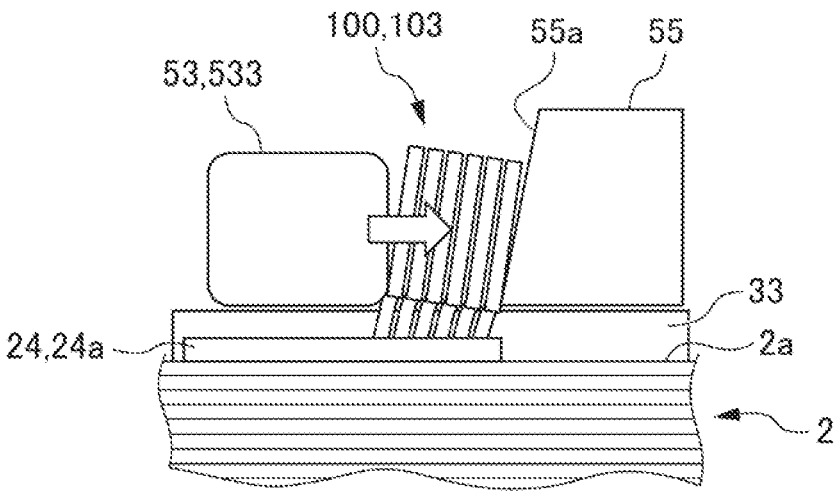
FIG. 15B is a diagram illustrating the state in which the coil is being pressed against the restrictor by the presser.
Figures 16, 17:
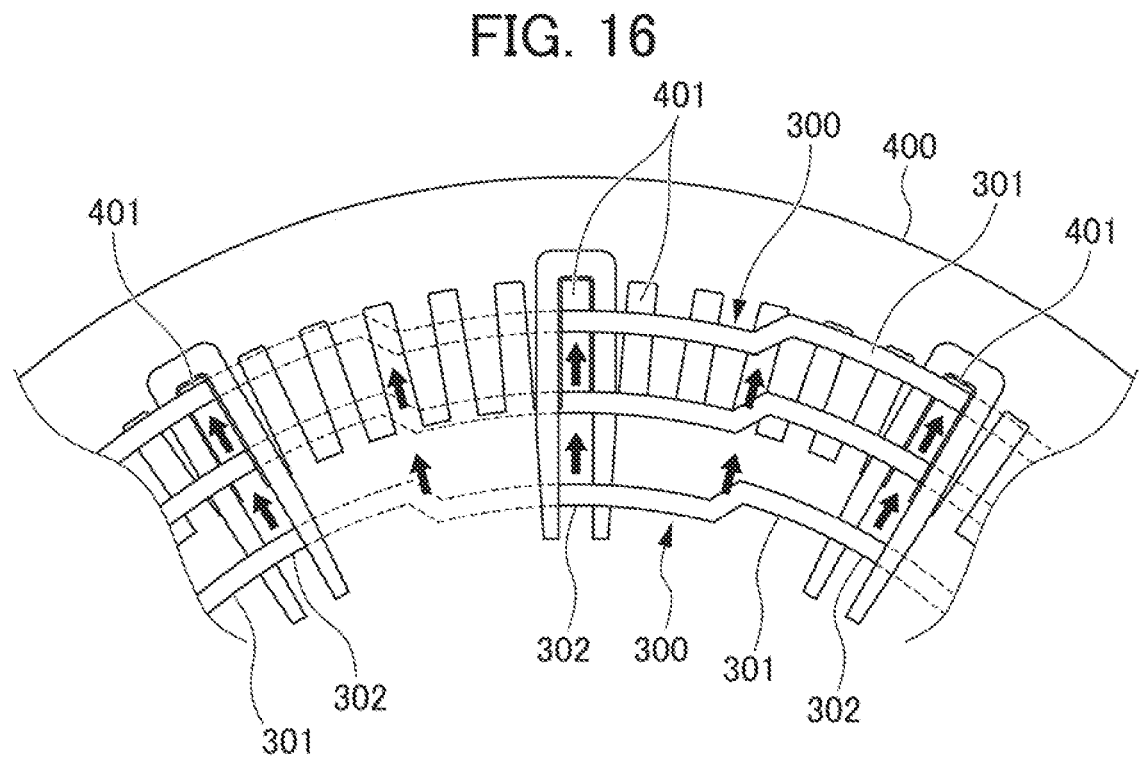
FIG. 16 is a plan view showing a state in which the coil is being inserted into the slots.
FIG. 17 is a diagram illustrating a state in which return of the coil end portions occurs due to springback.

FIGS. 15A and 15B show a state in which the coil end portions 103 are pressed against the restrictor 55 the inner peripheral surface 55a of which is an inclined surface. The coil end portions 103 pressed by the piece members 533 of the coil presser 53 come into contact with the bottom edge of the inclined inner peripheral surface 55a of the restrictor 55 (the edge on the end face 2a side of the stator core 2) (FIG. 15A). After that, when the coil end portions 103 are further pressed, the coil end portions 103 are compressed while being inclined outward in the radial direction along the inclined inner peripheral surface 55a of the restrictor 55 (FIG. 15B). The compressed coil end portions 103 are formed in a shape inclined outward in the radial direction as the coil end portions 103 are farther away from the end face 2a of the stator core 2 in the axial direction. Therefore, the height of protrusion of the coil end portions 103 is controlled, and space on the inner diameter side of the coil end portions 103 (such as space for inserting a rotor) can be easily secured.

In the case of such a restrictor 55, the outer peripheral surface of the piece members 533 of the coil presser 53 may be also configured as an inclined surface that is inclined outward in the radial direction with an increase in distance from the end face 2a of the stator core 2 in the axial direction, similarly to the inner peripheral surface 55a of the restrictor 55.

In other words, according to the coil insertion device 1 of the present embodiment, the following effects can be obtained. That is, the coil insertion device 1 of the present embodiment is a device including the coil diameter expansion device 5 that inserts the strip-shaped coil 100 in a wound state into the slots 22 of the stator core 2 by expanding the strip-shaped coil 100 in diameter from the inside of the stator core 2. The coil diameter expansion device 5 is provided with the coil presser 53 arranged inside the strip-shaped coil 100, the coil presser 53 pressing the coil end portions 103 of the strip-shaped coil 100 outward from inside to expand the coil end portions 103 in diameter and the restrictor 55 arranged outside the strip-shaped coil 100, the restrictor 55 restricting outward movement of the coil end portions 103 expanded in diameter by the coil presser 53 and sandwiching the coil end portions 103 of the strip-shaped coil 100 inserted in the slots 22 with the coil presser 53. According to the above, by sandwiching the coil end portions 103 of the strip-shaped coil 100 inserted in the slots 22 between the coil presser 53 and the restrictor 55, it is possible to offset springback that occurs on the coil end portions 103. Therefore, it is possible to prevent the strip-shaped coil 100 from returning inward due to springback of the coil end portions 103 after the strip-shaped coil 100 is inserted into the slots 22 and, therefore, improve workability of coil insertion work. By the coil end portions 103 being sandwiched between the coil presser 53 and the restrictor 55, gaps among the straight portions 102 of the strip-shaped coil 100 laminated in the slots 22 are also eliminated. Since the straight portions 102 are prevented from excessively hitting a back portion 24b of the pieces of insulating paper 24 in the slots 22, the pieces of insulating paper 24 are prevented from being crushed.

If the inner peripheral surface 55a of the restrictor 55 is a surface perpendicular to the end face 2a of the stator core 2, it is possible to apply pressing force equally to the coil end portions 103 and lay out the coil end portions 103 on the end face 2a of the stator core 2 in good order.

If the inner peripheral surface 55a of the restrictor 55 is an inclined surface inclined outward in the radial direction with an increase in distance from the end face 2a of the stator core 2, it is possible to control the height of protrusion of the coil end portions 103 and easily secure space on the inner diameter side of the coil end portions 103.

Furthermore, according to the coil insertion method of the present embodiment, the following effects can be obtained. That is, the coil insertion method of the present embodiment is a method of inserting the strip-shaped coil 100 in a wound state into the slots 22 of the stator core 2 by expanding the strip-shaped coil 100 in diameter from the inside of the stator core 2. The method includes: pressing the coil end portions 103 of the strip-shaped coil 100 outward from inside to expand the coil end portions 103 in diameter by the coil presser 53 arranged inside the strip-shaped coil 100 to insert the strip-shaped coil 100 into the slots 22; and restricting outward movement of the coil end portions 103 expanded in diameter by the coil presser 53, by the restrictor 55 arranged outside the strip-shaped coil 100 and sandwiching the coil end portions 103 of the strip-shaped coil 100 inserted in the slots 22 between the coil presser 53 and the restrictor 55. According to the above, by sandwiching the coil end portions 103 of the strip-shaped coil 100 inserted in the slots 22 between the coil presser 53 and the restrictor 55, it is possible to offset springback that occurs on the coil end portions 103. Therefore, it is possible to prevent the strip-shaped coil 100 from returning inward due to springback of the coil end portions 103 after the strip-shaped coil 100 is inserted into the slots 22 and, therefore, improve workability of coil insertion work. By the coil end portions 103 being sandwiched between the coil presser 53 and the restrictor 55, gaps among the straight portions 102 of the strip-shaped coil 100 laminated in the slots 22 are also eliminated. Since the straight portions 102 are prevented from excessively hitting a back portion 24b of the pieces of insulating paper 24 in the slots 22, the pieces of insulating paper 24 are prevented from being crushed.

The coil insertion device 1 of the embodiment described above is configured so that the axial directions of the stator core 2 and the coil winding jig 4 are set to a horizontal direction, but the coil insertion device 1 may be configured so that the axial directions of the stator core 2 and the coil winding jig 4 are set to any direction other than the horizontal direction, such as a vertical direction.

EXPLANATION OF REFERENCE NUMERALS

1: Coil insertion device
2: Stator core
2a: End face
22: Slot
5: Coil diameter expansion device (Coil diameter expander)
53: Coil presser
55: Restrictor
55a: Inner peripheral surface
100: Strip-shaped coil (Coil assembly)
103: Coil end portion

What is claimed is:
1. A coil insertion device comprising coil diameter expanders, the coil diameter expanders being configured to insert a coil assembly in a wound state into slots of a stator core by expanding the coil assembly in diameter from inside of the stator core, each of the coil diameter expanders comprising:
a coil presser that is arranged inside the coil assembly and presses coil end portions of the coil assembly outward from inside to expand the coil end portions in diameter; and
a restrictor that is arranged outside the coil assembly, restricts outward movement of the coil end portions expanded in diameter by the coil presser, and sandwiches the coil end portions of the coil assembly inserted in the slots with the coil presser, wherein
the coil presser includes a plurality of piece members arranged in an annular shape, a movable cylinder portion and a movable arm portion, the movable arm portion is translated by the movable cylinder portion to expand in diameter the annular shape in which the plurality of piece members are arranged, and each of the plurality of piece members has a substantially fan shape, and has a pair of fitting protrusions at one end portion in a circumferential direction.

2. The coil insertion device according to claim 1, wherein the restrictor has an inner peripheral surface that is perpendicular to an end face of the stator core.

3. The coil insertion device according to claim 1, wherein the restrictor has an inner peripheral surface as an inclined surface that is inclined outward in a radial direction with an increase in distance from an end face of the stator core.

* * * * *